United States Patent [19]

O'Neill

[11] 4,046,967
[45] Sept. 6, 1977

[54] LINE CIRCUIT USING MINIATURE LINE TRANSFORMER

[75] Inventor: John Francis O'Neill, Boulder, Colo.

[73] Assignee: Bell Telephone Laboratories, Incorporated, Murray Hill, N.J.

[21] Appl. No.: 711,809

[22] Filed: Aug. 5, 1976

[51] Int. Cl.² .............................................. H04Q 1/28
[52] U.S. Cl. ................................ 179/18 FA; 179/16 F
[58] Field of Search .................. 179/77, 16 F, 18 FA, 179/70, 2.5 R, 84 R, 84 A, 81 R; 336/170; 323/48

[56] References Cited
FOREIGN PATENT DOCUMENTS 2,254,168   7/1975   France ................................. 179/77

Primary Examiner—Thomas A. Robinson
Attorney, Agent, or Firm—Howard R. Popper

[57] ABSTRACT

A line circuit is disclosed employing a transformer having tip and ring windings and a third balancing winding designed to be serially connected in circuit with the tip and ring windings and poled so as to balance out their DC magnetization. The AC components of longitudinal current flowing through the tip and ring windings are prevented from flowing through the balancing winding by a capacitor bypass which offers a low impedance path compared to that of the balancing winding. This capacitor is prevented from short circuiting the AC voice frequency voltages induced by transformer action in the balancing winding by driving the balancing winding from the collector terminal of a transistor biased to remain out of saturation and which, therefore, exhibits a high impedance to changes in collector voltage. The resistance in the emitter circuit of this transistor determines the level of DC current delivered through the balancing winding to the tip and ring windings and the telephone line. The transistor base is supplied with current drive by a Darlington pair which avoids longitudinal unbalance in the tip and ring conductors. By effectively preventing the effects of DC magnetization a smaller and lighter weight transformer core is obtained.

8 Claims, 1 Drawing Figure

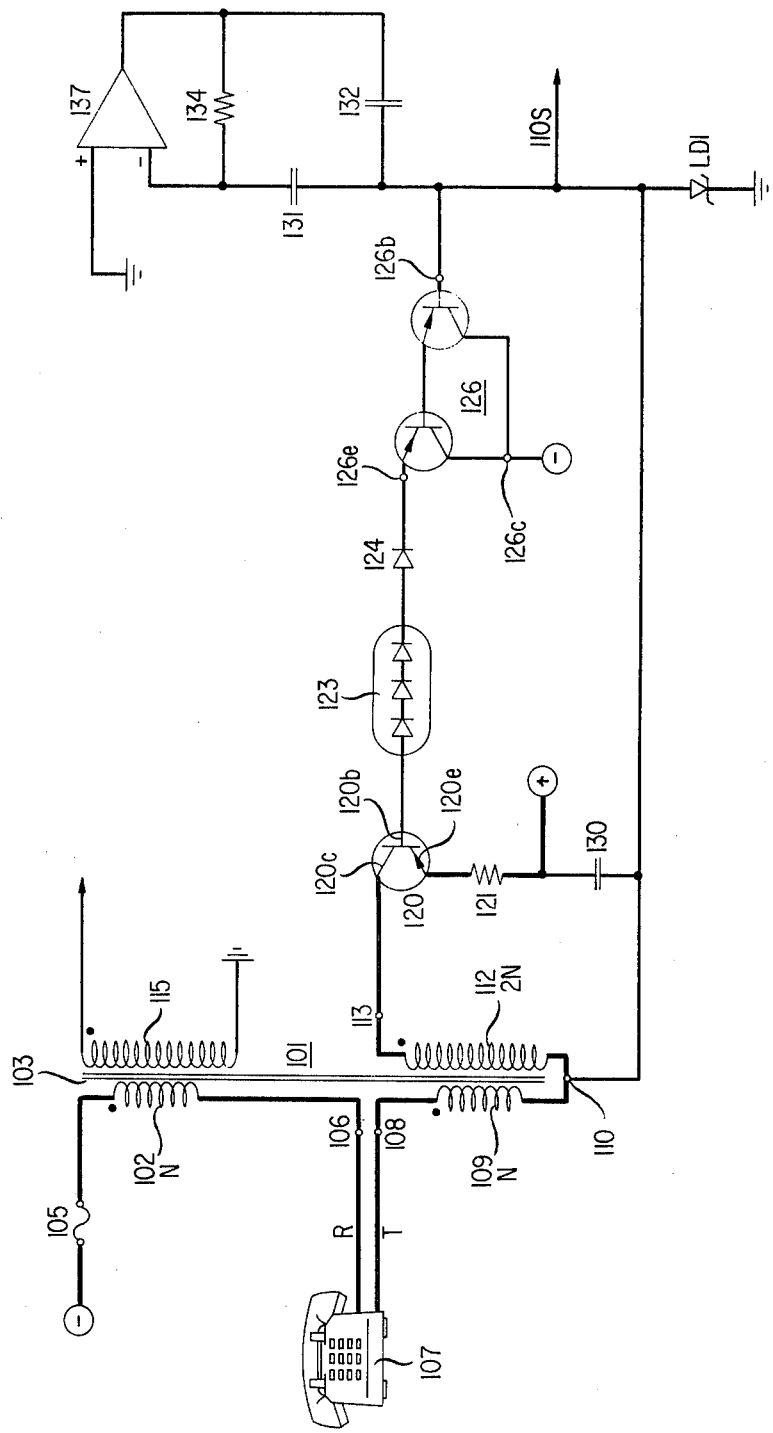

LINE CIRCUIT USING MINIATURE LINE TRANSFORMER

BACKGROUND OF THE INVENTION

This invention relates to telephone line circuits and, more particularly, to line circuits for supplying battery feed to one or more remote telephone sets.

Most line circuits for supplying the DC current required by the telephone sets' carbon microphone employ a line transformer. The transformer permits a balanced line circuit to be connected to an unbalanced switching path, it provides impedance transformation, and, if properly connected, it prevents longitudinal voltages appearing on the balanced line side from being coupled to its unbalanced side.

The line windings of the transformer either may be connected to carry the DC line current needed by the remote carbon microphone or they may be isolated from the DC current by means of a blocking capacitor. In the latter case, shunt feed inductors must usually be employed to prevent the low-impedance battery supply from short circuiting the AC components of the speech signal.

Heretofore, it has been suggested that the bulky current feed inductors could be replaced by a pair of opposite conductivity-type transistors biased for constant current operation to prevent excessive current on short loops and to provide adequate current on long loops. Examples of this type of shunt feed may be found in J. K. Livingstone U.S. Pat. No. 3,035,122, issued May 15, 1962, and in S. Orbach U.S. Pat. No. 3,955,052, issued May 4, 1976. It is to be noted, however, that these shunt feed arrangements require the use of a high quality blocking capacitor having low leakage and adequate capacitance to provide good AC coupling of speech signals to the transformer winding. In addition, the dielectric material of the blocking capacitor should be able to withstand lightning voltage surges of several hundred volts that may occur if one of the pair of carbon block protectors develops high impedance to ground with age.

On the other hand, in the conventional series feed arrangement, the two split primary windings of the line transformer respectively carry the DC microphone current to the tip and ring conductors of the telephone line. Unfortunately, the need to carry the DC current requires that more "iron" be employed in the transformer core to avoid core saturation. The increased size and weight of such construction detracts from the utility of series feed arrangements in the newer, lightweight and compact styles of construction which have come into vogue in the telephone industry with the advent of printed wiring boards and the expanding usage of integrated circuit technology.

One approach that might at first suggest itself to one concerned with reducing the effect of transformer core saturation is to provide a third winding that would be poled oppositely with respect to the tip and ring windings so as to balance out their net DC magnetization but which would be shunted by a capacitor to bypass the speech signals. The speech signals must be bypassed to prevent the third winding from also neutralizing the AC induction of the tip and ring windings. Because of transformer action, however, the third winding also exerts a cancelling effect on the speech signals since it is magnetically coupled by the changing flux in the tip and ring windings and the shunting capacitor, if it is sufficiently large to bypass the "wire components" of speech signals, exhibits a low impedance to the "induced" speech signals. Thus, the third winding acts as a highly loaded secondary of the line transformer and, accordingly, this type of construction is not in itself effective to reduce the amount of transformer "iron" required.

SUMMARY OF THE INVENTION

I have discovered that a reduction in the amount of transformer core iron may, nevertheless, be obtained by employing a third winding to cancel the effects of DC magnetization in the tip and ring windings if the third winding is driven from a sufficiently high impedance source so that the source, third winding and bypass capacitor form a loop circuit in which only a negligible amount of AC current can flow. Since this loop effectively presents an open circuit to voltages induced in the third winding, the third winding does not load the AC voice signals from the tip and ring windings.

In accordance with the principles of my invention, in one illustrative embodiment thereof, the drive current source includes a transistor having its collector connected to one end of the third winding to present a high AC impedance thereto. The other end of the third or balancing winding is connected in series with the tip and ring windings of the transformer, the circuit for which includes the tip and ring conductors of the telephone line and the remote telephone set. A bypass capacitor having an appropriately low impedance at voice signal frequencies prevents the voice signals that are carried in the tip and ring windings from flowing through the third winding. In the illustrative embodiment, the base drive for the current source transistor is supplied through a dynamic biasing arrangement including a Darlington circuit so that the power dissipation in the current source transistor does not depend on the loop length of the tip and ring conductors or vary appreciably with the number of telephone sets bridged across the tip and ring conductors.

BRIEF DESCRIPTION OF THE DRAWING

The foregoing and other objects and features of my invention may become apparent from the ensuing description, when read together with the drawing, the single FIGURE of which shows a three-winding transformer line circuit employing the constant current supply and voice current bypass arrangement of my invention.

GENERAL DESCRIPTION

Transformer 101 includes a primary winding 102 connected between fused negative line battery 105 and terminal 106. The ring conductor R extends between the remote telephone set 107 and terminal 106. Another primary winding 109 is connected between reference terminal 110 and terminal 108 to which tip conductor T leading from telephone set 107 is also connected. Primary windings 102 and 109 each have the same number of turns N and are poled so as to be series-aiding with respect to the magnetic field which they produce in core 103. A third or balancing winding 112 having as many turns as the sum of the turns comprising windings 102 and 109 is connected between reference terminal 110 and high impedance current feed terminal 113. Winding 112 is poled so as to be series-opposed with respect to flux field produced in core 103 by windings 102 and 109.

Transformer 101 includes a secondary winding 115 which operates in the conventional fashion of line circuit transformer secondary windings and will not be discussed further herein except to note that while primary windings 102 and 109 are designed to present a carefully balanced-to-ground impedance to the tip and ring conductors T, R of the line, the secondary winding 115 may be connected to a circuit which is unbalanced with respect to ground and thus serve to couple a balanced to an unbalanced circuit in the usual way.

The circuit supply path that is connected to current feed terminal 113 comprises transistor 120, the collector 120c of which is directly connected to terminal 113, and the emitter 120e of which is connected in circuit with emitter resistor 121 to a source of positive bias potential. The base 120b of transistor 120 is biased to remain out of saturation for the expected range of voltage variation at terminal 110 so that it will reflect at its collector terminal 120c a high impedance to terminal 113 and winding 112, connected thereto. In *Integrated Electronics* by Millman and Halkias, McGraw-Hill, 1972, at page 273, it is explained that the output impedance of the common emitter transistor circuit (where the emitter resistor is much larger than the sum of the internal resistance of the voltage source connected to the base and the base input resistance $h_{ie}$) is given by:

$$R_o \approx \frac{1 - h_{fe}}{h_{oe}} + \frac{(R_s + h_{ie})(1 + h_{oe}R_e)}{h_{oe}R_e}. \quad (1)$$

Using conventional values of $h$-parameters, the dynamic output resistance will thus be several hundred kilohms, at the very least. The emitter-base biasing circuit for transistor 120 comprises triple diode 123, single diode 124 and the two emitter-base drops of Darlington-connected transistor pair 126. The emitter 120e of series current feed transistor 120 is thus biased seven diode drops above the potential of reference terminal 110.

The voltage at terminal 110 is a function of loop current which, in turn, depends on loop length. This voltage is applied to the base 126b of the Darlington pair which provides base current to transistor 120 without drawing any appreciable current through the tip and ring conductors T, R. Accordingly, no line current that flows through windings 102 and 109 will fail to flow through winding 112 and, vice versa, the DC magnetization of windings 102 and 109 may be perfectly balanced by the current that flows through winding 112.

With respect to voice frequency currents in the tip and ring conductors T, R these currents flow through the serially aiding tip and ring windings, 109, 102 and capacitor 130 to the effective AC grounds present at the negative battery 105 and the positive battery at the junction of capacitor 130 and resistor 121. The signal level at the tip and ring may be as high as +7 dBm. In a 6000 loop system this requires a peak voltage of 2.45 volts. This full voltage is coupled to winding 112 of transformer 103 and is applied across the series combination of transistor 120, resistor 121 and capacitor 130. Most of the signal appears between the collector and emitter of transistor 120. With the emitter 120e returned to the fixed positive voltage, the collector must be more than 2.45 volts more negative than the emitter to prevent saturation on positive signal peaks.

The potentials at node 110 and at node 113 vary with the resistance of the line connected to conductors T and R. If the base 120b were held at a fixed potential, transistor 120 would act as a constant current source and would saturate when $I_L(R_{121} + R_L + R_{TRANS}) = 29V$, where $R_L$ is the loop resistance and $R_{TRANS}$ is the sum of the resistances of transformer windings 102, 109 and 112. Assuming $R_{TRANS} = 50\Omega$, and $R_{121} = 360\Omega$, for $I_L = 30mA$ the maximum loop resistance would be 556.67 ohms. Removing 200Ω for the station set gives a very short loop of 356.67Ω.

With seven diode drops maintained between 120e and node 110, the loop current adjusts itself according to loop length and a fixed 2.8 volts is maintained between the collector and emitter of transistor 120 to accommodate the 2.45 volt peak modulation signal.

The dynamic impedance exhibited by collector 120c makes the branch circuit comprising terminal 110, winding 112, transistor 120, resistor 121 and the AC ground at the positive battery a very high impedance path compared to the branch from terminal 110 to positive battery that includes capacitor 130. Accordingly, the "wire" components of voice frequency current flow through the tip and ring windings and capacitor 130 but the induced voltage in winding 112 is presented with the high dynamic impedance of collector 120c. Because of the high dynamic impedance presented to winding 112 by collector 120c, capacitor 130 does not short circuit winding 112 but is effective to bypass to ground alternating components of voice signal current flowing through windings 102 and 109.

From the standpoint of the alternating current equivalent circuit of transformer 101, the fused negative line battery 105 is effectively at AC ground. Capacitor 130 must effectively maintain terminal 110 also at an effective AC ground so that all AC components of voice signal current will flow only through windings 102 and 109. This would dictate that capacitor 130 should have as high a capacitance and, hence, as low an AC impedance as possible. A reactance of approximately 1 ohm at 200 Hz would be adequate to assure that the transformer is maintained at longitudinal balance of the loop circuit. This would require that capacitor 130 have a capacitance of approximately 680 μf, a size which would effectively prevent sudden changes in potential at terminal 110.

In accordance with the teaching of the invention of J. E. Dalley Ser. No. 711,811, filed of even date herewith, however, a capacitor 130 of much smaller size may be employed. Moreover, with the large capacitance needed to exhibit the 1 ohm reactance, it should be noted that terminal 110 could not be used as a take-off point to detect dial pulses. Assuming a nominal loop current of 30 milliamperes, and a capacitor 130 of 680μf, the voltage at terminal 110 could not change by more than 2.2 volts in the 50 millisecond interval between dialing. A 2.2 volt change would not be sufficient for reliable noise-free dial pulse detection.

In accordance with principles of the operation of the J .E. Dalley dynamic bypass circuit, capacitor 130 is made to exhibit a very low AC impedance to ground for "in-band" voice signals in the frequency range from 200 Hz to 3.4 kHz while being permitted to exhibit its intrinsic capacitance at dial pulsing frequencies. This is accomplished by causing operational amplifier 137 to saturate in response to changes in the DC level at terminal 110 occasioned by the opening and closing of the loop by the telephone dial of telephone set 107 at the distant end of the tip and ring conductors, T, R. Operational amplifier 137 saturates when the large step functions due to loop opens and closures area applied and does not recover until the change has been detected (by circuitry, not shown, but indicated as being connected at arrow 110S). Such circuitry might simply consist of a single NPN grounded emitter transistor having its base connected at a point on a voltage divider extending between terminal 110 and the positive source supplying the emitter of transistor 120.

The manner in which operational amplifier multiplies the effective capacitance of capacitor 130 for in-band signals will now be described.

It will be recalled that the negative feedback operational amplifier permits essentially no voltage difference to exist between its plus (+) and minus (−) input terminals and that neither input terminal draws any current. Accordingly, any current flowing upward through capacitor 131 must flow through resistor 134 since no current can enter the minus terminal of amplifier 137. The impedance seen at terminal 110 looking towards the junction point of capacitor 130 with capacitors 131 and 132 is given by dividing the voltage at terminal 110 by the total current leaving the terminal, or:

$$Z_{110} = V_{110}/(I_{131} + I_{130} + I_{134}) \quad (2)$$

where $I_{131}$ is the current through capacitor 131, $I_{130}$ is the current through capacitor 130 and $I_{134}$ is the current through resistor 134.

Writing the expression for each of the above currents in terms of the particular capacitance or resistance in its path, the impedance looking out of terminal 110 may be expressed ultimately as:

$$Z_{110} = -1/(A\omega^2 - jB) \quad (3)$$

where $$A = C_{131} \cdot C_{132} \cdot R_{134} \quad (4)$$

and $$B = C_{131} + C_{132} + C_{130} \quad (5)$$

Converting the expression for the impedance in equation (3) above to rectangular form shows that it is composed of a negative resistive component, $$R_{110} = -A/(A^2\omega^2 + B^2) \quad (6)$$

and a capacitive reactive component, $$X_{110} = -B/(A^2\omega^3 + B^2\omega) \quad (7)$$

For practical values of A and B, the B-terms of equations (6) and (7) can be dropped for frequencies in the audio band, so that $$R_{110} = -1/A\omega^2 \quad (8)$$

which has a very small magnitude at audio frequencies. The negative sign is, therefore, of no consequence to the circuit's function of providing a virtual AC ground at terminal 110. However, in arriving at the values that should be employed for capacitors 130, 131, 132 and resistor 134, it is to be considered that it would be desirable to permit the connection of as many as five telephone sets in parallel at terminals 106 and 108. The resistance reflected to terminal 110 by such an arrangement would be very low necessitating that $R_{110}$ be even lower so that the positive resistance will exceed the negative resistance to avoid oscillation. For $R_{110}$ to be less that 1 ohm at frequencies above 200 Hz, the A-term of equation (8) must be greater than $6.33 \times 10^{-7}$. Selecting capacitor 131 and capacitor 132 each to have a value of 1μf and resistor 134 to have a value of 620k ohms yields a value for $R_{110}$ of approximately −1.02 ohms and a value for $X_{110}$ of 0.023 ohms which is equivalent to a capacitance of 35,774μf. So long as amplifier 137 is operative, this large capacitance shunts balancing winding 112 at frequencies within the band of audio signals and effectively prevents any of the audio signal currents in the primary tip and ring windings 102, 109 from flowing through the balancing winding. Because of the negative sign of $R_{110}$, capacitor 130 must be chosen large enough to prevent oscillation at low frequencies. Resonance will occur at some frequency where the effective capacitive reactance $X_{110}$ equals the inductive reactance of the windings of transformer 101. In practice, it has been found that a value of capacitor 130 of the order of 10 to 15μf is adequate to guarantee stability within the tolerances of commercially available tantalum capacitors and other components.

It can be appreciated that the voltage at the output of amplifier 137 is the same as the voltage drop in resistor 134, the current through which is the same as that through capacitor 131. The current through capacitor 131 is given by the product of its reactance and $V_{110}$ and that current multiplied by the resistance 134 is the output voltage of amplifier 137. Referring to equation (4) and its dependency on the values of capacitor 131 and resistor 134, it would be advantageous to keep the values of these components small to avoid large signals at the amplifier output. The value of capacitor 132 should not be made so large, however, as to load the amplifier output. On the other hand, terminal 110 is so well bypassed at audio frequencies that $V_{110}$ is very small so that the amplifier output remains in the linear region.

As mentioned above, it is desirable to permit the voltage of terminal 110 to change during dial pulsing so that dial pulses can be detected. The nominal value of loop current during the off-hook condition should be approximately 30 milliamperes and this value of current must be brought to zero within the 50 millisecond interval between dial pulses. In order to achieve a sufficient voltage change at terminal 110, the effective capacitance thereat should be no greater than that of capacitor 130, which itself must not be so large that the integral $1/C \int i \, dt$ will be too small in the 50 millisecond interval to develop a reliably detectable voltage change. A reasonable voltage change is achieved, in fact, since the amplifier saturates in response to the step function input. The saturation of amplifier 137 can be understood to occur when its output voltage approaches that of either the positive or negative voltage of the DC power supplies (not shown) required to operate the amplifier, or ground potential, depending on the polarity of the signal applied to its minus input. Obviously, the output voltage cannot change by more than the magnitude of this supply voltage. Applying Kirchhoff's voltage equations to the voltage divider comprising capacitors 131 and 132 and the feedback resistor 134, it is apparent that the voltage output of amplifier 137 is given by:

$$V_o = j\omega C_{131} R_{137} V_{110} \quad (9)$$

The output voltage is thus a function of the frequency $\omega$ of the signal input to the amplifier. When dial pulsing occurs the step function discontinuity in loop current flow is equivalent to an extremely high frequency signal burst. The high frequency of the step function input due to dialing causes a very great change at the output of amplifier 137 which change tends to exceed that of amplifier 137's supply voltage causing the amplifier to cease functioning. When amplifier 137 ceases to function, the only capacitance connected to terminal 110 is that of capacitor 130 itself, which capacitance is sufficiently small, in the absence of amplifier 137, not to affect the detection of dial pulses. A simple external transistor isolating amplifier (not shown) may thus be connected at terminal 110S to reflect the change in potential at terminal 110 effective by the appearance of the dial pulse.

It is to be understood that the foregoing is only illustrative of the principles of my invention. Numerous modifications such as the substitution of an alternative base current source to drive current supply transistor 120 may be made so long as the current therethrough does not longitudinally unbalance transformer 101. Other modifications may be made by those of ordinary skill in the art without departing from the spirit and scope of my invention. What is claimed is:

1. A line circuit for the tip and ring conductors of a telephone line comprising:
   a transformer having tip, ring and balancing windings, said balancing winding being poled in opposite sense to that of said tip, ring and balancing windings, said current source means having a high AC impedance; and
   a capacitor in circuit with said current source means and said balancing winding, said capacitor exhibiting a low AC impedance to current in said tip and ring windings.

2. A line circuit according to claim 1 wherein said current source means comprises:
   a source of potential;
   solid-state means in circuit between said source of potential and said windings; and
   means for maintaining said solid-state means in an unsaturated condition.

3. The invention of claim 2 wherein said solid-state means includes a transistor having its emitter-collector path connected between said source of potential and said windings and wherein said means for maintaining said solid-state means in said unsaturated condition includes a Darlington transistor connected to supply base current to said first mentioned transistor.

4. The invention of claim 3 wherein the collector of said first mentioned transistor is connected to one end of said balancing winding and said capacitor is connected to the junction of said tip and ring windings with the other end of said balancing winding.

5. The invention of claim 4 wherein the collector-emitter path of said Darlington transistor is in circuit between a source of current and the base of said first mentioned transistor and the base of said Darlington transistor is connected to said junction of said windings with said capacitor.

6. A telephone line circuit comprising a transformer having at least one winding for sensing audio frequency variations in loop current and a balancing winding for counterbalancing the DC magnetization produced by said audio frequency sensing winding,
   a capacitor providing an audio frequency bypass around said balancing winding, and
   means including the collector-emitter path of a transistor for exhibiting a high impedance path in circuit with said capacitor and said balancing winding to audio frequency voltages induced therein.

7. The invention of claim 6 further comprising means for biasing said transistor to remain out of saturation throughout the peak value of said voltages induced in said balancing winding.

8. The invention of claim 7 wherein said biasing means includes the junctions of a plurality of solid-state devices in circuit between the base of said transistor and one end of said balancing winding.

* * * * *